Figure 3:
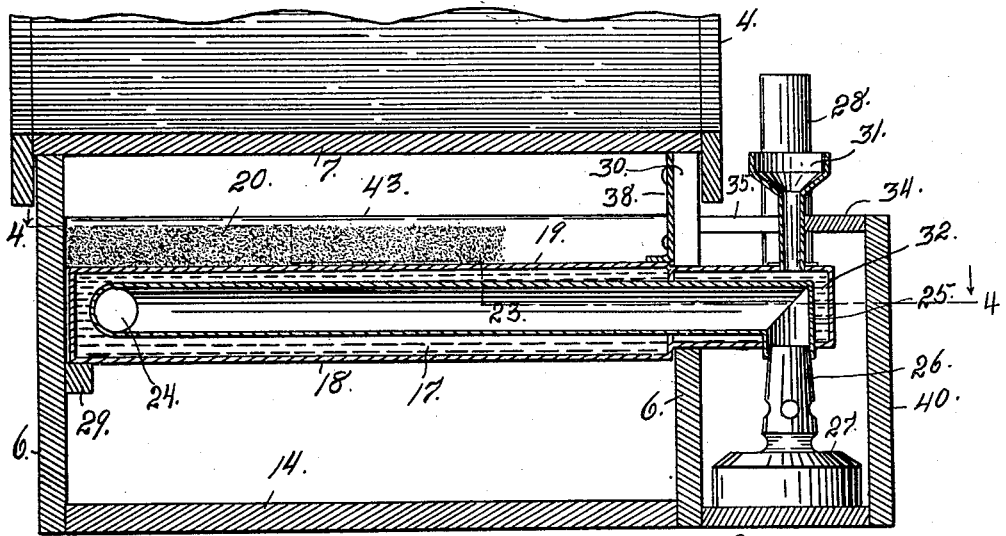

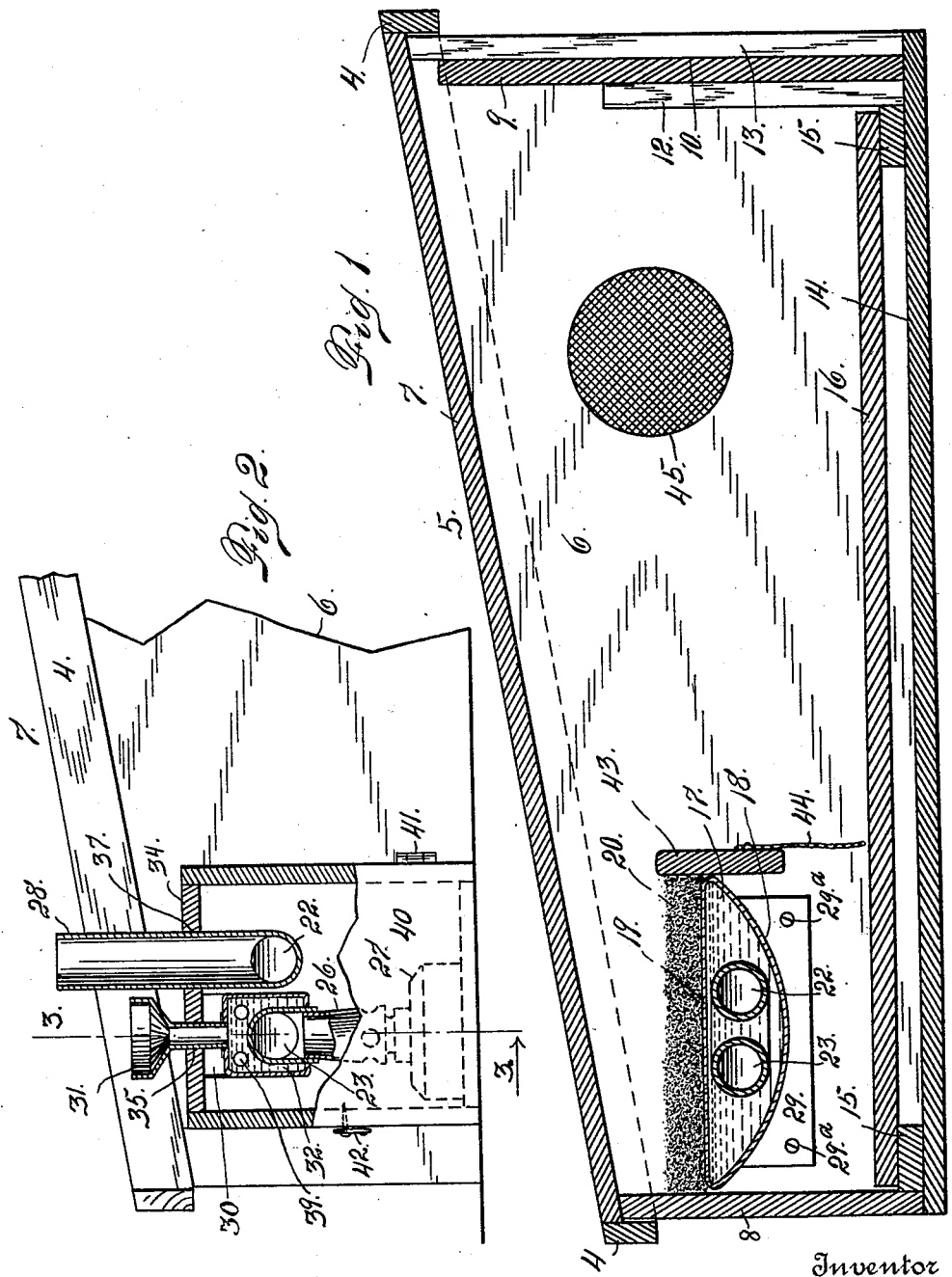

J. B. COYKENDALL.
BROODER.
APPLICATION FILED MAR. 12, 1910.

1,007,271.

Patented Oct. 31, 1911.
2 SHEETS—SHEET 2.

Witnesses
Otto E. Hoddick.
C. H. Roessner.

Inventor
J. B. Coykendall.
By C. J. O'Brien.
Attorney

UNITED STATES PATENT OFFICE.

JOHN B. COYKENDALL, OF LOVELAND, COLORADO.

BROODER.

1,007,271. Specification of Letters Patent. Patented Oct. 31, 1911.

Application filed March 12, 1910. Serial No. 549,027.

*To all whom it may concern:*

Be it known that I, JOHN B. COYKENDALL, a citizen of the United States, residing at Loveland, county of Larimer, and State of Colorado, have invented certain new and useful Improvements in Brooders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in brooders, my object being to provide a construction adapted for the rearing of chickens either indoors or out of doors, which shall as nearly as practicable, give the young chickens the same advantages possessed by those which are reared by hens.

In my improved construction I employ a box in one extremity of which is located a tank containing water through which a hot air pipe is passed. This pipe consists of two parallel members joined at their rear extremities with an abrupt bend, one forward extremity being in communication with the chimney of a lamp while the other extremity is in communication with a short chimney or flue for the escape of the products of combustion. The lamp is located within an auxiliary box or casing located outside of the main box of the structure. This lamp casing has a hinged door whereby it is readily accessible for the purpose of inserting and removing the lamp.

The top of the water tank is covered with a layer of sand or suitable dirt for use by the chickens. This dirt also forms a sort of insulator for the tank whereby the water therein is caused to retain its heat, since radiation is retarded. At the same time the warm water of the tank keeps the dirt at a suitable temperature for the chickens.

The box is provided with a false bottom which is used when the chickens are very young and which places them sufficiently above the true bottom of the box, to enable them to jump on top of the water tank and wallow in the dirt or sand covering the same as aforesaid.

An important feature of the device consists in the fact that the bottom of the water tank, which is exposed to enable the chickens to come in direct contact therewith, is rounded or curved whereby it conforms to a certain extent to the shape of the body of a hen when sheltering her chickens. By virtue of this curved formation of the exposed bottom of the tank, the chickens are enabled to quickly disengage their bodies therefrom, since there are no extensive areas lying in the same plane. Hence the chickens are not liable to be injured by too much heat. Furthermore, it becomes practicable, by reason of the curved bottom of the tank, for the chickens to stand with their bodies in contact with a portion of the tank bottom, while there is room for their heads above, thus allowing them to stand in a natural position with their bodies in contact with the warm surface of the tank, while their heads are free therefrom or in contact therewith at an upper point.

Having briefly outlined my improved construction, I will proceed to describe the same in detail, reference being made to the accompanying drawings in which is illustrated an embodiment thereof.

Figure 4:
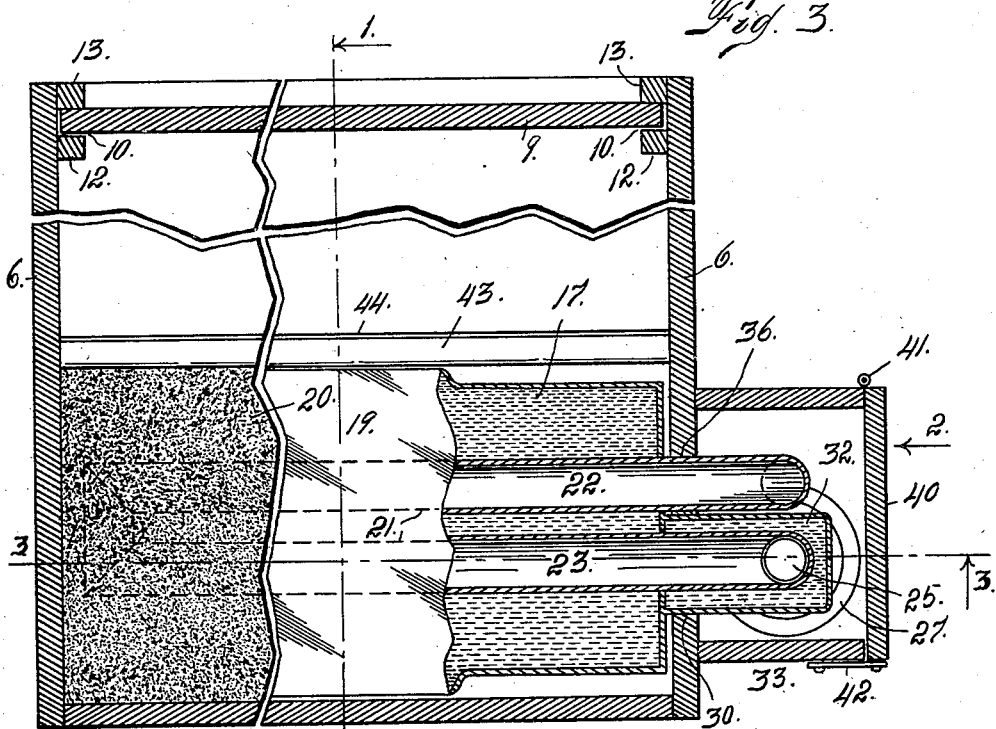

In this drawing: Figure 1 is a vertical longitudinal section taken through the brooder. This may be termed a section taken on the line 1—1, Fig. 4. Fig. 2 is a fragmentary elevation partly in section, looking at the brooder in the direction indicated by arrow 2, Fig. 4. Fig. 3 is a vertical cross section taken on the line 3—3, Fig. 2. Fig. 4 is a horizontal section taken on the line 4—4, Fig. 3, the construction being partly broken away and the water tank being shown partly in section on a lower plane.

The same reference characters indicate the same parts in all the views.

Let the numeral 5 designate the body of the structure considered in its entirety. This box is composed of parallel vertically disposed side members 6 which are narrowest at one extremity and increase in height therefrom toward the opposite extremity. The box is provided with a removable cover 7 having a depending member 4 extending therearound and engaging the side walls of the box exteriorly. The lower end of the box is closed by a wall 8 and its opposite end by a removable vertically sliding door 9, which engages a groove 10 formed by cleats or strips 12 and 13 respectively. The true bottom of the box is designated 14 and at its opposite ends is equipped with cross pieces 15 upon which rests a removable false bottom 16.

In the lower end of the box and extending transversely therethrough is located a water tank 17 having a curved bottom 18 and a flat top 19, the latter being covered by a layer of dirt or sand 20. Passing longitudinally through this tank which is normally filled with water, is a hot air pipe 21 composed of two parallel members 22 and 23 which are in communication with each other at one extremity as shown at 24. The opposite extremity of the member 23 of the pipe has a short depending member 25 adapted to fit around the top of a chimney 26 of a lamp 27. The extremity of the member 22 of the pipe adjacent the lamp, is provided with an upwardly projecting branch member 28 which serves as a chimney or flue for the escape of the products of combustion. The said tank is supported at one end by a block 29 secured to the side of the tank by fastening devices 29ª, the upper edge of the block being curved to conform to the curve of the bottom of the tank; while its opposite extremity rests upon one side of the box, the latter being slotted as shown at 30 to permit the introduction of a funnel-shaped filler 31 which projects upwardly from the top of a water jacket extension 32 of the tank, which extension projects into an auxiliary casing 33 located beyond the side of the box. This water jacket surrounds the lamp extremity of the member 23 of the hot air pipe, and thus prevents this extremity from becoming heated to too great a degree. Furthermore, by virtue of the water jacket extension of the tank, practically all of the heat of the lamp is utilized. Attention is called to the fact that the top 34 of the casing 33 is also slotted as shown at 35 to permit the funnel-shaped filler 31 to assume its position in the device when the parts are assembled. The side of the box is slotted as shown at 36 to allow the flue extremity of the pipe member 22 to pass through the side of the box into the lamp casing 33, and the top of the said casing is also slotted as shown at 37, for the same purpose. It will be understood that the chimney or flue 28 and also the funnel-shaped filler 31 are fixedly connected with the hot air pipe and the water tank respectively. After the tank, with its attachments, has been located in the box, a plate 38 is attached to one side of the box above the water tank, for the purpose of closing the slots 30 and 36 formed in the side of the box as aforesaid, thus preventing the entrance of the external air to the brooder, at the top of the box and directly above the tank. The water jacket 32 is in communication with the body of the water tank by openings 39.

The auxiliary casing 33 is provided with a door 40 hinged at 41 and adapted to be secured in the closed position by a fastening device 42. By opening this door, access is given to the interior of the casing 33, for the purpose of removing and inserting the lamp.

In the operation of the device it is only necessary to fill the tank with water, light the lamp and insert it in the casing 33 with its chimney in communication with the part 25 of the hot air tube. The hot air passing through the tube will soon heat the water to the desired temperature, after which very little heat will be required to maintain the water, and consequently the external surface of the tank sufficiently warm for the purpose.

When the chickens are small the false bottom 16 is kept in place to allow the chickens to reach the dirt 20 above the tank. In order to maintain the dirt in place above the tank on the side corresponding with the interior of the box or on the side of the tank toward the door or gate 9, a side member 43 is secured to the opposite sides of the tank. This side member projects both above and below the top of the tank. Its upward extension maintains the dirt 20 in place above the tank on one side as aforesaid; while its depending portion confines the warmth within the comparatively small space below the bottom of the tank. This function is further accomplished by attaching a flexible apron 44 to the member 43, the flexible apron extending downwardly close to the top of the false bottom 16. This apron allows the chickens to run into and out of the space below the bottom of the tank, since the apron will move back and forth in response to the pressure exerted.

In order that the main chamber of the box may contain pure air at all times, the box is provided with one or more screen covered openings 45.

After the chickens get sufficiently large to enable them to reach the dirt at the top of the box, without the aid of the false bottom 16, the latter is removed, since it makes more room for the chickens after they attain considerable size.

From the foregoing description, it will be understood that by virtue of my improved hot air pipe, one extremity of which is located outside of the body of the box and communicates with the chimney of the lamp, and whereby its opposite extremity is also outside of the body of the box and communicates with the atmosphere, the products of combustion are entirely cut off from the chamber of the box where the chickens are located. This is an important feature, since the fumes, gases and products of combustion resulting from the burning of the necessary fuel, are very injurious, and I might say deadly, to the small chickens, if the latter are allowed to come in contact with these fumes and gases. My improved brooder has been constructed to avoid this difficulty, while at the same time utilizing to the fullest possible extent the heat afforded by the lamp.

Having thus described my invention, what I claim is:

1. A brooder comprising a box, a water-containing tank located therein, a hot air pipe passing through the tank and having both extremities located outside of the tank, an auxiliary casing surrounding the extremities of the pipe, a source of heat located within the casing and in communication with one extremity of the pipe, an upwardly projecting flue with which the opposite extremity of the pipe is in communication, the top of the flue extending above the casing and in communication with the atmosphere, one side of the box being provided with vertical slots adapted to receive the hot air pipe, the top of the auxiliary casing being provided with a slot in communication with one of the vertical slots of the box, the slot of the auxiliary casing being adapted to receive the flue, substantially as described.

2. A brooder, comprising a box, a water tank supported therein, a hot air pipe passing through the tank and having both extremities located outside of the tank, an auxiliary casing surrounding the extremities of the pipe, a lamp located within the casing, and having its chimney in communication with one extremity of the pipe, a water jacket surrounding the extremity of the pipe with which the chimney of the lamp is in communication, the said water jacket being in communication with the water in the tank, and a filler pipe for the tank in communication with the water jacket, its upper extremity being exposed above the top of the casing, an upwardly projecting flue with which the opposite extremity of the pipe is in communication, the top of the flue extending above the casing, and in communication with the atmosphere, one side of the box being provided with vertical slots adapted to receive the water jacket and hot air pipe respectively, the top of the auxiliary casing being provided with slots in communication with the vertical slots of the box, the slots of the auxiliary casing being adapted to receive the filler pipe and the flue, respectively, for the purpose set forth.

In testimony whereof I affix my signature in presence of two witnesses.

JOHN B. COYKENDALL.

Witnesses:
J. WESLEY JONES,
J. M. CUNNINGHAM.

---

Copies of this patent may be obtained for five cents each, by addressing the "Commissioner of Patents, Washington, D. C."